US012587259B2

(12) United States Patent
Liu et al.

(10) Patent No.: US 12,587,259 B2
(45) Date of Patent: Mar. 24, 2026

(54) METHOD PERFORMED BY USER EQUIPMENT, AND USER EQUIPMENT

(71) Applicant: SHARP KABUSHIKI KAISHA, Sakai City (JP)

(72) Inventors: Lei Liu, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 25 days.

(21) Appl. No.: 18/701,798

(22) PCT Filed: Oct. 14, 2022

(86) PCT No.: PCT/CN2022/125366
§ 371 (c)(1),
(2) Date: Apr. 16, 2024

(87) PCT Pub. No.: WO2023/066154
PCT Pub. Date: Apr. 27, 2023

(65) Prior Publication Data
US 2024/0413878 A1     Dec. 12, 2024

(30) Foreign Application Priority Data
Oct. 18, 2021    (CN) ......................... 202111212679.7

(51) Int. Cl.
*H04B 7/02*       (2018.01)
*H04B 7/0456*    (2017.01)
*H04B 7/06*       (2006.01)

(52) U.S. Cl.
CPC ....... *H04B 7/06964* (2023.05); *H04B 7/0456* (2013.01)

(58) Field of Classification Search
CPC .......................... H04B 7/06964; H04B 7/0456
USPC ............... 375/267, 260, 259, 219, 295, 316
See application file for complete search history.

(56) References Cited

U.S. PATENT DOCUMENTS

| | | | |
|---|---|---|---|
| 2022/0046441 A1* | 2/2022 | Agiwal | H04B 7/088 |
| 2022/0061087 A1* | 2/2022 | Koskela | H04W 72/046 |
| 2022/0104036 A1* | 3/2022 | Zhou | H04W 24/04 |

OTHER PUBLICATIONS

CATT, "Beam reporting and beam failure recovery for multi-TRP", R1-2109187, 3GPP TSG RAN WG1 #106bis-e, e-Meeting, Oct. 11-19, 2021.
Samsung, "Revised WID: Further enhancements on MIMO for NR", RP-211586, 3GPP TSG RAN Meeting #92e, Electronic Meeting, Jun. 14-18, 2021.
Samsung, "New WID: Further enhancements on MIMO for NR", RP-193133, 3GPP TSG RAN Meeting #86, Sitges, Spain, Dec. 9-12, 2019.

* cited by examiner

*Primary Examiner* — Zewdu A Kassa
(74) *Attorney, Agent, or Firm* — ScienBiziP, P.C.

(57) ABSTRACT

Provided in the present invention are a method performed by user equipment and user equipment. The method includes: generating a Medium Access Control control element (MAC CE) for reporting beam failure information; and transmitting the generated MAC CE to a base station, wherein a format of the MAC CE for reporting both the beam failure information of a cell and the beam failure information of a transmit/receive point (TRP) is designed, and SP, Ci, TCi, TRP, AC, Candidate RSID, and R fields are present in the format of the MAC CE.

9 Claims, 1 Drawing Sheet

METHOD PERFORMED BY USER EQUIPMENT, AND USER EQUIPMENT

TECHNICAL FIELD

The present invention relates to the technical field of wireless communications. More specifically, the present invention relates to a beam failure recovery reporting method performed by user equipment, and corresponding user equipment.

BACKGROUND

A work item related to further enhancements on MIMO (FeMIMO) related to Release 17 was proposed (see non-patent literature: RP-193133 New WID: Further enhancements on MIMO for NR) and approved at the 3rd Generation Partnership Project (3GPP) RAN #86 plenary meeting held in December 2019. For the latest version of the work item, refer to non-patent literature: RP-211586 Revised (2nd) WID proposal FeMIMO. The work item mainly studied enhancements on multi-beam operations, enhancements on multi-TRP operations, enhancements on SRSs, and enhancements on CSI measurement and reporting. Enhancements on multi-beam and multi-TRP operations include intra-cell scenarios and inter-cell scenarios.

In the prior art, a base station may configure, for each serving cell of UE, a reference signal for beam failure detection and/or beam failure recovery. When it is detected that a beam failure occurs on a beam of a current service, cell information including the beam failure may be transmitted to the base station. The reference signal for beam failure detection and/or beam failure recovery may be detected so as to obtain a candidate beam, and the network is notified of relevant information via a beam failure recovery procedure.

In FeMIMO, in order to better support multi-TRP, a reference signal for beam failure detection and/or beam failure recovery may be respectively configured for each TRP. When it is detected that a beam of a current service fails, the reference signal for beam failure detection and/or beam failure recovery may be detected so as to obtain a candidate beam, and the network is notified of relevant information is via a beam failure recovery reporting procedure. In FeMIMO, beam failure recovery reporting may be performed per TRP.

In FeMIMO, in order to reduce latency and signaling overhead of a multi-beam, in a carrier aggregation scenario, multi-BWP/component carrier (CC) transmission of the UE may use the same beam. A plurality of BWPs/CCs for transmission are grouped, and each group includes one reference BWP/CC. The network performs TCI state parameter configuration for the reference BWP/CC. Configuration for the other CCs in the same CC set or CC group may be omitted, and configuration parameters of the reference BWP/CC are used instead, thereby reducing signaling. In this way, the UE may perform beam failure detection only for the reference BWP/CC.

The present invention discusses issues related to how to perform beam failure recovery reporting in multi-beam and multi-TRP scenarios.

SUMMARY

In order to address the aforementioned issue in the prior art, provided in the present disclosure are a beam failure recovery reporting method performed by user equipment and corresponding user equipment.

According to a first aspect of the present disclosure, provided is a beam failure recovery (BFR) reporting method performed by user equipment (UE), comprising: generating a Medium Access Control control element (MAC CE) for reporting beam failure information; and transmitting the generated MAC CE to a base station, wherein a format of the MAC CE for reporting both the beam failure information of a cell and the beam failure information of a transmit/receive point (TRP) is designed, and SP, Ci, TCi, TRP, AC, Candidate RS ID, and R fields are present in the format of the MAC CE.

In the above-described method, optionally, for the serving cell configured with multi-TRP BFD/BFR, if the TCi is set to 0, at least one of the following is comprised: the beam failure is detected on one of the TRPs; the beam failure is detected on one of the TRPs, and evaluation of a candidate beam of the TRP has been completed; an octet corresponding to the serving cell and comprising an AC field is present; and an octet corresponding to the serving cell and comprising a TRP field is present.

In the above-described method, optionally, for the serving cell configured with the multi-TRP BFD/BFR, if the TCi is set to 1, at least one of the following is comprised: the beam failure is detected on N of the TRPs; the beam failure is detected on N of the TRPs, and evaluation of the candidate beams of the N TRPs have all been completed; N octets corresponding to the serving cell and comprising an AC field are present; and N octets corresponding to the serving cell and comprising a TRP field are present. N is the number of TRPs that the serving cell is configured with or the number of BFD/BFR reference signal sets.

In the above-described method, optionally, for the SCell configured with the multi-TRP BFD/BFR, when corresponding Ci is set to 1, the beam failure is detected on a first TRP that the SCell is configured with, and evaluation of the candidate beam has been completed. One octet comprising the AC field is present.

In the above-described method, optionally, for the SCell configured with the multi-TRP BFD/BFR, when the corresponding Ci is set to 2, the beam failure is detected on a second TRP that the SCell is configured with. One octet comprising the AC field is present.

In the above-described method, optionally, for the SCell configured with the multi-TRP BFD/BFR, when the corresponding Ci is set to 3, at least one of the following is comprised: the beam failure is detected on all TRPs that the SCell is configured with, and evaluation of the candidate beams of all of the TRPs has been completed; and two octets comprising the AC field are present.

In the above-described method, optionally, for the SpCell configured with the multi-TRP BFD/BFR, if the SP is set to 1, the beam failure is detected on all of the TRPs that the SpCell is configured with, and evaluation of the candidate beams has all been completed.

In the above-described method, optionally, for a serving cell or the SCell configured with the multi-TRP BFD/BFR, when the corresponding Ci is set to 1, at least one of the following is comprised: the beam failure is detected on at least one TRP that the serving cell or the SCell is configured with, and evaluation of the candidate beam has been completed; the beam failure is detected on all of the TRPs that the serving cell or the SCell is configured with, and evaluation of the candidate beams has all been completed; the TCi field is present; and the AC field is present.

In the above-described method, optionally, the number of octets occupied by the TCi field increases.

According to a second aspect of the present disclosure, provided is user equipment, comprising: a processor; and a memory storing instructions, where the instructions, when run by the processor, perform the method according to any one of the above items.

Effect of Invention

According to the method performed by user equipment and the user equipment of the present disclosure, a beam failure recovery reporting method performed by user equipment and corresponding user equipment can be provided.

DETAILED DESCRIPTION

Figure 1:
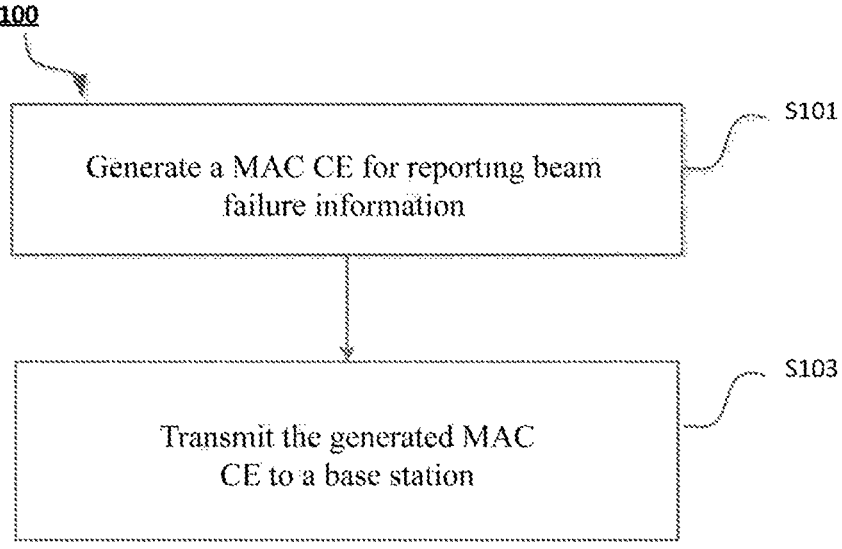
FIG. 1 shows a flowchart of a method 100 applied to user equipment (UE) according to an embodiment of the present disclosure.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

The following describes some terms involved in the present invention. For the specific meanings of the terms, please see the latest 3GPP standards and specifications.

UE: User Equipment
NR: New Radio
RRC: Radio Resource Control
MAC: Medium Access Control
RRC CONNECTED: RRC connected state
RRC INACTIVE: RRC inactive state
RRC_IDLE: RRC idle state
RAN: Radio Access Network
RSRP: Reference Signal Receiving Power
AS: Access Stratum
PDCCH: Physical downlink control channel
BWP: Bandwidth Part
DCI: Downlink Control Information
DL: Downlink
IE: Information Element
CE: Control Element
MIB: Master Information Block
SIB: System Information Block
RLM: Radio Link Monitoring
BFD: Beam Failure Detection
RLF: Radio Link Failure
BFR: Beam Failure Recovery
BLER: Block Error Rate
RRM: Radio Resource Management
Serving Cell: a PCell, a PSCell, or an SCell
SpCell: Special Cell, which may be a PCell or a PSCell
PCell: Primary Cell
PSCell: Primary SCG Cell
SCell: Secondary Cell
SCG: Secondary Cell Group
C-RNTI: Cell RNTI
RNTI: Radio Network Temporary Identifier
HARQ: Hybrid Automatic Repeat Request SINR: Signal to Noise and Interference Ratio
DRB: (user) Data Radio Bearer
MIMO: Multiple-Input Multiple-Output
TRP: Transmit/Receive Point
TCI: Transmission Configuration Indicator
SRS: Sounding Reference Signal
CSI: Channel-State Information
PDSCH: Physical Downlink Shared Channel
PDCCH: Physical Downlink Control Channel
PUSCH: Physical Uplink Shared Channel
PUCCH: Physical Uplink Control Channel
PCI: Physical Cell Identifier
UL-SCH: Uplink Shared Channel
CA: Carrier Aggregation
CC: Component Carrier In the present invention, a network, a base station, and a RAN may be used interchangeably. The network may be a Long Term Evolution (LTE) network, a new RAT (NR) network, an enhanced Long Term Evolution (eLTE) network, or another network defined in a subsequent evolved version of the 3GPP.

In the present invention, user equipment (UE) may refer to an NR device supporting multi-beam enhancement, or may refer to an NR device supporting multi-TRP enhancement, or may refer to an NR device supporting FeMIMO, or may refer to an NR device supporting SRS enhancement, or may refer to an NR device supporting CSI measurement and reporting enhancement, or may refer to a device supporting multi-TRP BFR, or may refer to a device supporting BWP/CC grouping or a reference BWP/CC, or may refer to an NR device or an LTE device of other types, as described in the background.

Cancel, release, delete, flush, clear, etc., are interchangeable. Execute, use, employ, and apply are interchangeable. Configure and reconfigure are interchangeable. Index, indication, identity, information, and number are interchangeable.

"Set" and "group" are interchangeable.

"UL-SCH resource", "UL resource", and "UL grant" are interchangeable.

"A TRP", "a TRP index", "a reference signal set", "a reference signal set index", "a BFD reference signal set", "a BFR reference signal set", "a BFD reference signal set index", and "a BFR reference signal set index" are interchangeable.

"Per TRP BFD/BFR", "multi-TRP BFD/BFR", and "TRP specific BFD/BFR" are interchangeable.

"CC set BFD/BFR", "CC group BFD/BFR", "reference BWP/CC BFD/BFR", "multi-beam BFD/BFR", "per CC set BFD/BFR", and "per CC group BFD/BFR" are interchangeable.

"CC set BFR MAC CE", "CC group BFR MAC CE", "reference CC BFR MAC CE", and "multi-beam BFR MAC CE" are interchangeable. The MAC CE may also have other names, as long as the name is used to indicate a MAC CE of beam failure recovery of a certain BWP/CC set/group or some BWP/CC set/groups or a certain reference BWP/CC.

"BFR MAC CE", "TRP BFR MAC CE", "per TRP BFR MAC CE", "TRP specific BFR MAC CE", and "multi-TRP BFR MAC CE" are interchangeable. The MAC CE may also have other names, as long as the name is used to indicate a MAC CE of beam failure recovery of a certain TRP or some TRPs.

In the present invention, "BFD/BFR" refers to "BFD and/or BFR".

The function of the MAC CE in the present invention may also be implemented by an indication of a physical layer, DCI, or a report.

Hereinafter, a description will be given of related art of the present invention.

Beam failure detection (BFD) and beam failure recovery (BFR) are performed in an RRC connected state. BFD is the UE detecting a beam failure and recovering from a beam failure according to a reference signal configured by a network. A BFD procedure may be related to each serving cell, including an SpCell and an SCell. A configured reference signal for the BFD procedure may be an SSB and/or a CSI-RS. The reference signal herein is used for beam detection, and may therefore be referred to as a reference beam. The UE performs the BFD procedure on an activated downlink BWP. The UE, on the basis of the configured reference signal, compares a BLER of a downlink radio link and a threshold $Q_{out\_LR}$. If downlink radio link quality is below $Q_{out\_LR}$, the physical layer transmits a beam failure instance indication to an upper layer. Configured parameters for the BFD procedure further include: beamFailureDetectionTimer and beamFailureInstanceMaxCount. beamFailureDetectionTimer is used to control a timer that is started or restarted after a MAC entity receives a beam failure instance indication transmitted by the physical layer. For BFD that occurs on the SpCell, the timer is stopped after BFR succeeds. A variable BFI_COUNTER is used by the MAC layer to count the number of consecutive beam failure instance indications that are received, and an initial value of the variable is 0. Each time a beam failure instance indication is received, 1 is added to the variable. If beamFailureDetectionTimer expires, or beamFailureDetectionTimer, beamFailureInstanceMaxCount, or any reference signal for beam failure detection configured for the upper layer of the present serving cell changes, then BFI_COUNTER is cleared to zero.

When BFI_COUNTER is greater than or equal to beamFailureInstanceMaxCount, if the serving cell is an SCell, a BFR procedure of the cell is triggered, i.e., a BFR MAC CE or a truncated BFR MAC CE including serving cell beam failure recovery information is transmitted. If the serving cell is not an SCell (i.e., the serving cell is an SpCell), a random access procedure is initiated on the SpCell to recover from the beam failure. Whether a BFR MAC CE or a truncated BFR MAC CE is transmitted depends on the size of a UL-SCH resource. If the size of the resource is not sufficient for accommodating a BFR MAC CE, a truncated BFR MAC CE is selected to be reported.

The BFR MAC CE and the truncated BFR MAC CE each have two formats: a one-octet Ci field bitmap format and a four-octet Ci field bitmap format. When a certain serving cell detects a beam failure and has completed evaluation of a candidate beam, and if the index of the serving cell is less than eight, the one-octet Ci field bitmap format is used, otherwise, the four-octet Ci field bitmap format is used.

One-octet Ci field format:

| $C_7$ | $C_6$ | $C_5$ | $C_4$ | $C_3$ | $C_2$ | $C_1$ | SP |
|---|---|---|---|---|---|---|---|
| AC | R | | | Candidate RS ID or R bits | | | |
| | | | . . . | | | | |
| AC | R | | | Candidate RS ID or R bits | | | |

Four-octet Ci field format:

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| AC | R | | | Candidate RS ID or R bits | | | |
| | | | . . . | | | | |
| AC | R | | | Candidate RS ID or R bits | | | |

SP: This field indicates beam failure detection for an SpCell. If the SP is set to 1, it is indicated that a beam failure is detected in the SpCell, and a BFR MAC CE is included in a MAC PDU as part of a random access procedure, and transmitted to the base station. In other cases, the SP is set to 0.

Ci: This field indicates beam failure detection for an SCell. i corresponds to a sequence number (ServCellIndex) of the SCell. For example, C1 corresponds to beam failure detection for the SCell numbered 1. When the corresponding Ci is set to 0, it may be indicated that no beam failure is detected in the SCell, or it may be indicated that although a beam failure is detected in the SCell, evaluation of a candidate beam has not been completed, and the AC field of the SCell is not present. When the corresponding Ci is set to 1, it may be indicated that a beam failure is detected in the SCell, and evaluation of a candidate beam has been completed. The AC field of the SCell is present. For a truncated BFR MAC CE, the number of octets including the AC field cannot exceed the limit of the resource size of the UL-SCH UL grant. For a certain serving cell, if the Ci field corresponding thereto is set to 1, a corresponding octet including at least the AC field is present.

AC: This field indicates whether the Candidate RS ID field is present in the octet. If the AC field is set to 1, the Candidate RS ID field in the octet is present. If the field is set to 0, the Candidate RS ID field in the octet is not present, and is replaced by R bits. AC octets are arranged in ascending order of indexes of corresponding SCells.

Candidate RS ID: This field is set to an index number of a reference signal of which a measured value is greater than a configured threshold. This field may be used by the base station to select a candidate beam.

R: This field is a reserved bit, and is typically set to 0.

In a multi-TRP scenario, a plurality of TRPs may be present in one cell, and the network may configure, for each TRP, a reference signal or a reference signal set for BFD. Each reference signal set may be represented by an index, and each index corresponds to a TRP. When the UE detects that downlink quality corresponding to a certain TRP is overly low (as described above, or a new threshold for determining link quality may be defined), the physical layer reports and indicates a beam failure instance indication to the MAC layer. The MAC layer may determine, by means of the accumulated number of indications reaching or exceeding a maximum value, that a beam failure has occurred on the TRP. The UE may further detect a reference signal set for BFD corresponding to the TRP, so as to find a candidate reference beam when a beam failure occurs. When the UE determines that a beam failure has occurred, the MAC initiates a BFR procedure related to the TRP.

When the MAC initiates the BFR procedure related to the TRP, the UE may report, to the base station, information of the TRP at which the beam failure occurs and possible candidate beam information. The information may be carried in a MAC CE and transmitted to the base station. For an SCell, if it is detected that a beam failure occurs on both of two TRPs that the cell is configured with, beam failure information of the two TRPs may be reported to the network via the MAC CE. Such a MAC CE may be referred to as a multi-TRP BFR MAC CE.

When a cell is configured with one or more BFD reference signal sets, or when a cell is configured with an indication identity of multi-TRP BFD/BFR, or when a cell is configured with a plurality of TRPs, it is considered that the cell is configured with multi-TRP BFD/BFR. Conversely, it is considered that the cell is configured with legacy BFD/BFR, i.e., cell-level BFD/BFR, of beam failure detection and reporting are performed per cell.

In a multi-beam scenario, multi-BWP/component carrier (CC) transmission of the UE may use the same beam. A plurality of BWPs/CCs for transmission may be grouped, and each group includes one reference BWP/CC. The network performs TCI state parameter configuration for the reference BWP/CC. Configuration for the other CCs in the same CC set or CC group may be omitted, and configuration parameters of the reference BWP/CC are used instead. The UE may perform beam failure detection only for the reference BWP/CC, and transmit, to the network, a MAC CE carrying beam failure recovery information of the reference BWP/CC when a beam failure occurs. Such a MAC CE may be referred to as a CC set BFR MAC CE.

The present invention considers how UE performs beam failure recovery in a multi-beam and/or multi-TRP scenario so as to be able to quickly recover from a beam failure to perform data transmission, thereby improving performance.

Hereinafter, several embodiments of the present invention for addressing the above problems are described in detail.

FIG. 1 shows a flowchart of a method 100 applied to user equipment (UE) according to an embodiment of the present disclosure.

It should be noted that in all embodiments herein, all references to "serving cell" may also be replaced with "SCell".

Embodiment 1

The present embodiment includes steps 101 and 103.

In step 101, UE generates a MAC CE for reporting beam failure information.

In step 103, the UE transmits the generated MAC CE to a base station.

In the present embodiment, a MAC CE format is designed, and may be used to report both beam failure information of a cell and beam failure information of a TRP.

In the format, optionally, SP, Ci, TCi, TRP, AC, Candidate RS ID, and R fields are present.

SP

The SP field indicates beam failure detection for an SpCell configured with cell-level BFD/BFR, or indicates beam failure detection for an SpCell configured with multi-TRP BFD/BFR. For an SpCell configured with the cell-level BFD/BFR or an SpCell not configured with the multi-TRP BFD/BFR, the settings and indicated meaning of the SP are the same as those in the prior art, and are as described above. Details will not be described herein again.

For an SpCell configured with the multi-TRP BFD/BFR, if the SP is set to 0, one or a plurality of the following instances of information may be indicated:

No beam failure is detected on any TRP that the SpCell is configured with. For example, if the SpCell is configured with two TRPs, it is indicated that no beam failure is detected on either of the two TRPs.

A beam failure is detected on at least one TRP that the SpCell is configured with, but evaluation of a candidate beam has not been completed. No beam failure is detected on the other TRPs.

A beam failure is detected on all TRPs that the SpCell is configured with, but evaluation of candidate beams of all of the TRPs has not been completed.

For an SpCell configured with the multi-TRP BFD/BFR, if the SP is set to 1, one or a plurality of the following instances of information may be indicated:

A beam failure is detected on at least one TRP that the SpCell is configured with, and evaluation of a candidate beam has been completed. For example, if the SpCell is configured with two TRPs, it is indicated that a beam failure is detected on one of the TRPs, and evaluation of a candidate beam has been completed. No beam failure is detected on the other TRP.

A beam failure is detected on all TRPs that the SpCell is configured with, and evaluation of all candidate beams has been completed.

The TCi field is present.

The AC field is present.

Optionally, the SP field may be replaced with $C_0$.

Ci

The Ci field indicates beam failure detection for a serving cell or an SCell configured with the cell-level BFD/BFR, or indicates beam failure detection for a serving cell or an SCell configured with the multi-TRP BFD/BFR.

i corresponds to a sequence number or an index (ServCellIndex) of a serving cell or an SCell. For example, C1 corresponds to beam failure detection for a serving cell or an SCell numbered 1.

For a serving cell or an SCell configured with the cell-level BFD/BFR or a serving cell or an SCell not configured with the multi-TRP BFD/BFR, the settings and indicated meaning of the Ci are the same as those in the prior art, and are as described above. Details will not be described herein again.

For a serving cell or an SCell configured with the multi-TRP BFD/BFR, when the corresponding Ci is set to 0, one or a plurality of the following instances of information may be indicated:

No beam failure is detected on any TRP that the serving cell or the SCell is configured with. For example, if the serving cell or the SCell is configured with two TRPs, it is indicated that no beam failure is detected on either of the two TRPs.

A beam failure is detected on at least one TRP that the serving cell or the SCell is configured with, but evaluation of a candidate beam has not been completed. No beam failure is detected on the other TRPs.

A beam failure is detected on all TRPs that the serving cell or the SCell is configured with, but evaluation of candidate beams of all of the TRPs has not been completed.

For a serving cell or an SCell configured with the multi-TRP BFD/BFR, when the corresponding Ci is set to 1, one or a plurality of the following instances of information may be indicated:

A beam failure is detected on at least one TRP that the serving cell or the SCell is configured with, and evaluation of a candidate beam has been completed. For example, if the serving cell or the SCell is configured with two TRPs, it is indicated that a beam failure is detected on one of the TRPs, and evaluation of a candidate beam has been completed. No beam failure is detected on the other TRP.

A beam failure is detected on all TRPs that the serving cell or the SCell is configured with, and evaluation of all candidate beams has been completed.

The TCi field is present.

The AC field is present.

TCi

The TCi field indicates the number of TRPs of a serving cell configured with the multi-TRP BFD/BFR on which a beam failure is detected when the beam failure is detected on the serving cell configured with the multi-TRP BFD/BFR.

i corresponds to a number or an index (ServCellIndex) of a serving cell. For example, $TC_1$ corresponds to beam failure detection for a serving cell numbered 1.

For a serving cell configured with the cell-level BFD/BFR, the TCi field is not present, and is replaced with the reserved bit of the R field.

For a serving cell configured with the multi-TRP BFD/BFR, when the corresponding Ci field is set to 0, the TCi field is not present, and is replaced with the reserved bit of the R field.

For a serving cell configured with the multi-TRP BFD/BFR, when the corresponding Ci field is set to 1, the TCi field is present. When the TCi field is set to 0, one or a plurality of the following instances of information may be indicated:

One (or only one, or at least one) TRP failure is detected.

One (or only one, or at least one) TRP failure is detected, and evaluation of a candidate beam has been completed.

One octet corresponding to the serving cell and including the AC field is present.

One octet corresponding to the serving cell and including the TRP field is present.

For a serving cell configured with the multi-TRP BFD/BFR, when the corresponding Ci field is set to 1, the TCi field is present. When the TCi field is set to 1, one or a plurality of the following instances of information may be indicated:

Beam failures of N TRPs are detected.

Beam failures of N TRPs are detected, and evaluation of candidate beams of the N TRPs has all been completed.

N octets corresponding to the serving cell and including the AC field are present.

N octets corresponding to the serving cell and including the TRP field are present.

N is the number of TRPs or the number of BFD/BFR reference signal sets that the serving cell is configured with. For example, if the serving cell is configured with two TRPs, when the TCi field is set to 1, it is indicated that a beam failure is detected on both of the two TRPs, and evaluation of candidate beams for both of the two TRP has been completed. Two octets corresponding to the serving cell and including the AC field are present (or it may be expressed as: two octets corresponding to the serving cell and including the TRP field are present).

Optionally, it is possible that $TC_0$ is absent all the time, and the reserved bit of the R is directly set.

TRP

The TRP field indicates a TRP index, or indicates a BFD/BFR reference signal set index. If a serving cell is not configured with the multi-TRP BFD/BFR, the TRP field is not present, and is replaced with the reserved bit of the R. For example, when the TRP is set to 0, it is indicated that a beam failure is detected on a first TRP, or it is indicated that a beam failure is detected on a TRP of which the TRP index number is 0. When the TRP is set to 1, it is indicated that a beam failure is detected on a second TRP, or it is indicated that a beam failure is detected on a TRP of which the TRP index number is 1.

AC: This field indicates whether the Candidate RS ID is present in a current octet, and has the same meaning as that in the prior art.

Candidate RS ID: This field is set to a sequence number of a reference signal of which a measured value is greater than a configured threshold, and has the same meaning as that in the prior art.

R: This field is a reserved bit, and is typically set to 0.

Herein, for exemplary description, these fields are set to 0 or 1 in different cases, and correspondingly in corresponding cases, may also be set to 1 or 0, or may be set to "true" and "false", which is not limited herein. In addition, according to on reporting, the TRP, AC, Candidate RS ID, and R fields are not always present. In a special case, for example, when the UE generates the MAC CE, if a cell in which a beam failure is detected has not completed beam signal measurement, the MAC CE reported in this case includes only the Ci field, and all the values of the Ci field are set to "0". As another example, when the UE generates the MAC CE, if a cell in which a beam failure is detected is a cell that is configured with the cell-level BFD/BFR, the MAC CE reported in this case further includes, in addition to the Ci field, the AC field and the possible Candidate RS ID, but does not include the TRP field.

The table below shows possible distributions of these fields. The one-octet Ci field is used as an example as follows:

| $C_7$ | $C_6$ | $C_5$ | $C_4$ | $C_3$ | $C_2$ | $C_1$ | SP |
|---|---|---|---|---|---|---|---|
| $TC_7$ or R | $TC_6$ or R | $TC_5$ or R | $TC_4$ or R | $TC_3$ or R | $TC_2$ or R | $TC_1$ or R | $TC_0$ or R |
| AC | TRP or R | Candidate RS ID or R bits | | | | | |
| AC | TRP or R | . . . Candidate RS ID or R bits | | | | | |

The four-octet Ci field is used as an example as follows:

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | C11 | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| $TC_7$ or R | $TC_6$ or R | $TC_5$ or R | $TC_4$ or R | $TC_3$ or R | $TC_2$ or R | $TC_1$ or R | $TC_0$ or R |
| $TC_{15}$ or R | $TC_{14}$ or R | $TC_{13}$ or R | $TC_{12}$ or R | $TC_{11}$ or R | $TC_{10}$ or R | $TC_9$ or R | $TC_8$ or R |
| $TC_{23}$ or R | $TC_{22}$ or R | $TC_{21}$ or R | $TC_{20}$ or R | $TC_{19}$ or R | $TC_{18}$ or R | $TC_{17}$ or R | $TC_{16}$ or R |
| $TC_{31}$ or R | $TC_{30}$ or R | $TC_{29}$ or R | $TC_{28}$ or R | $TC_{27}$ or R | $TC_{26}$ or R | $TC_{25}$ or R | $TC_{24}$ or R |
| AC | TRP or R | Candidate RS ID or R bits | | | | | |
| AC | TRP or R | . . . Candidate RS ID or R bits | | | | | |

When the size of a UL-SCH resource is not sufficient for including the complete TRP BFR MAC CE, a truncated TRP BFR MAC CE may be reported. When a truncated TRP BFR MAC CE is reported, a reporting means that may be used may be either one of the following:

The Ci field must be carried, and the other fields are carried as many as possible depending on the size of an uplink resource.

The Ci field must be carried, and if the TCi field is present, the TCi field also must be carried. The other fields are carried as many as possible depending on the size of an uplink resource.

Embodiment 2

Based on Embodiment 1, in the present implementation, the TCi field is optimized, and the number of octets occupied by the TCi field is variable.

i corresponds to the number or the index of a serving cell configured with the multi-TRP BFD/BFR. 0 corresponds to a first serving cell configured with the multi-TRP BFD/BFR, and 1 corresponds to a second serving cell configured with the multi-TRP BFD/BFR, and so on. $TC_0$ corresponds to the number of TRPs at which a beam failure is detected when the beam failure is detected in the first serving cell configured with the multi-TRP BFD/BFR, and $TC_1$ corresponds to the number of TRPs at which a beam failure is detected when the beam failure is detected in the second serving cell configured with the multi-TRP BFD/BFR, and so on.

In this format, if a total of 32 serving cells are configured, and if eight of the serving cells are configured with the multi-TRP BFD/BFR, the TCi field needs to occupy only one octet at most.

The table below shows possible distributions of these fields. The four-octet Ci field is used as an example:

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | C11 | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| $TC_7$ or R | $TC_6$ or R | $TC_5$ or R | $TC_4$ or R | $TC_3$ or R | $TC_2$ or R | $TC_1$ or R | $TC_0$ or R |
| | | | . . . | | | | |
| $TC_{31}$ or R | $TC_{30}$ or R | $TC_{29}$ or R | $TC_{28}$ or R | $TC_{27}$ or R | $TC_{26}$ or R | $TC_{25}$ or R | $TC_{24}$ or R |
| AC | TRP or R | Candidate RS ID or R bits | | | | | |
| | | . . . | | | | | |
| AC | TRP or R | Candidate RS ID or R bits | | | | | |

Embodiment 3

Based on Embodiment 1, in the present implementation, another design is performed for the SP field and/or the Ci field.

SP

The SP field indicates beam failure detection for an SpCell configured with cell-level BFD/BFR, or indicates beam failure detection for an SpCell configured with multi-TRP BFD/BFR.

For an SpCell configured with the cell-level BFD/BFR or an SpCell not configured with the multi-TRP BFD/BFR, the settings and indicated meaning of the SP are the same as those in the prior art, and are as described above. Details will not be described herein again.

For an SpCell configured with the multi-TRP BFD/BFR, if the SP is set to 0, one or a plurality of the following instances of information may be indicated:

No beam failure is detected on any TRP that the SpCell is configured with. For example, if the SpCell is configured with two TRPs, it is indicated that no beam failure is detected on either of the two TRPs.

A beam failure is detected on at least one TRP that the SpCell is configured with, but evaluation of a candidate beam signal has not been completed. No beam failure is detected on the other TRPs.

A beam failure is detected on all TRPs that the SpCell is configured with, but evaluation of candidate beams of all of the TRPs has not been completed.

For an SpCell configured with the multi-TRP BFD/BFR, when the corresponding SP is set to 1, one or a plurality of the following instances of information may be indicated:

A beam failure is detected on a first TRP that the SpCell is configured with, and evaluation of a candidate beam has been completed.

An octet including the AC field is present, and one octet is present.

For an SpCell configured with the multi-TRP BFD/BFR, when the corresponding SP is set to 2, one or a plurality of the following instances of information may be indicated:

A beam failure is detected on a second TRP that the SpCell is configured with, and evaluation of a candidate beam has been completed.

An octet including the AC field is present, and one octet is present.

For an SpCell configured with the multi-TRP BFD/BFR, when the corresponding SP is set to 3, one or a plurality of the following instances of information may be indicated:

A beam failure is detected on all TRPs that the SpCell is configured with, and evaluation of candidate beams of all of the TRPs has been completed. For example, if the SpCell is configured with two TRPs, it is indicated that a beam failure is detected on both of the two TRPs, and evaluation of candidate beams of both of the two TRPs has been completed.

An octet including the AC field is present, and two octets are present.

Ci

The Ci field indicates beam failure detection for a serving cell or an SCell configured with the cell-level BFD/BFR, or indicates beam failure detection for a serving cell or an SCell configured with the multi-TRP BFD/BFR.

i corresponds to a sequence number or an index of a serving cell or an SCell. For example, C1 corresponds to beam failure detection for a serving cell or an SCell numbered 1.

For a serving cell or an SCell configured with the cell-level BFD/BFR or a serving cell or an SCell not configured with the multi-TRP BFD/BFR, the settings and indicated meaning of the Ci are the same as those in the prior art, and are as described above. Details will not be described herein again.

For a serving cell or an SCell configured with the multi-TRP BFD/BFR, when the corresponding Ci is set to 0, one or a plurality of the following instances of information may be indicated:

No beam failure is detected on any TRP that the serving cell or the SCell is configured with. For example, if the serving cell or the SCell is configured with two TRPs, it is indicated that no beam failure is detected on either of the two TRPs.

A beam failure is detected on at least one TRP that the serving cell or the SCell is configured with, but evaluation of a candidate beam has not been completed. No beam failure is detected on the other TRPs.

A beam failure is detected on all TRPs that the serving cell or the SCell is configured with, but evaluation of candidate beams of all of the TRPs has not been completed.

For a serving cell or an SCell configured with the multi-TRP BFD/BFR, when the corresponding Ci is set to 1, one or a plurality of the following instances of information may be indicated:

A beam failure is detected on a first TRP that the serving cell or the SCell is configured with, and evaluation of a candidate beam has been completed.

An octet including the AC field is present, and one octet is present.

For a serving cell or an SCell configured with the multi-TRP BFD/BFR, when the corresponding Ci is set to 2, one or a plurality of the following instances of information may be indicated:

A beam failure is detected on a second TRP that the serving cell or the SCell is configured with, and evaluation of a candidate beam has been completed.

An octet including the AC field is present, and one octet is present.

For a serving cell or an SCell configured with the multi-TRP BFD/BFR, when the corresponding Ci is set to 3, one or a plurality of the following instances of information may be indicated:

A beam failure is detected on all TRPs that the serving cell or the SCell is configured with, and evaluation of candidate beams of all the TRPs has been completed. For example, if the serving cell or the SCell is configured with two TRPs, it is indicated that a beam failure is detected on both of the two TRPs, and evaluation of candidate beams of both of the two TRPs has been completed.

An octet including the AC field is present, and two octets are present.

The table below shows possible distributions of these fields. Eight serving cells are used as an example:

| $C_3$ | | $C_2$ | $C_1$ | SP |
|---|---|---|---|---|
| $C_7$ | | $C_6$ | $C_5$ | $C_4$ |
| AC | TRP or R | | Candidate RS ID or R bits | |
| | | ... | | |
| AC | TRP or R | | Candidate RS ID or R bits | |

Embodiment 4

The present embodiment includes steps 401 and 403.

Optionally, UE performs beam failure detection for a reference BWP/CC, and generates a MAC CE for reporting CC set beam failure information.

Optionally, in step 403, the UE transmits the generated MAC CE to a base station.

In the present embodiment, a MAC CE format is designed, and may be used to report CC set beam failure information. The MAC CE may be referred to as a CC set BFR MAC CE.

In the format, Ci, TCi, TRP, AC, Candidate RS ID, and R fields are present.

Ci

The Ci field indicates beam failure detection for a CC set configured with cell-level BFD/BFR, or indicates beam failure detection for a CC set configured with multi-TRP BFD/BFR. In this case, BFD/BFR configurations of the CC set depend on configurations of the reference BWP/CC. That is, if the reference BWP/CC is configured with the cell-level BFD/BFR, the CC set to which the reference BWP/CC belongs is also considered to be configured with the cell-level BFD/BFR. If the reference BWP/CC is configured with the multi-TRP BFD/BFR, the CC set to which the reference BWP/CC belongs is also considered to be configured with the multi-TRP BFD/BFR.

Optionally, the Ci field may also directly indicate beam failure detection for a reference BWP/CC configured with the cell-level BFD/BFR, or indicate beam failure detection for a reference BWP/CC configured with the multi-TRP BFD/BFR.

i corresponds to a sequence number or an index of a CC set. For example, C0 corresponds to beam failure detection for a CC set numbered 0, and C1 corresponds to beam failure detection for a CC set numbered 1.

For a CC set or a reference BWP/CC configured with the cell-level BFD/BFR or a CC set or a reference BWP/CC not configured with the multi-TRP BFD/BFR, when the corresponding Ci is set to 0, it may be indicated that no beam failure is detected on the CC set or the reference BWP/CC, or it may be indicated that although a beam failure is detected on the CC set or the reference BWP/CC, evaluation of a candidate beam has not been completed, and the AC field corresponding to the CC set or the reference BWP/CC is not present. When the corresponding Ci is set to 1, it may be indicated that a beam failure is detected on the CC set or the reference BWP/CC, and evaluation of a candidate beam has been completed. The AC field corresponding to the CC set or the reference BWP/CC is present.

For a CC set or a reference BWP/CC configured with the multi-TRP BFD/BFR, the meaning specifically indicated by the Ci being set to 0 or 1 for the "CC set" or the "reference BWP/CC" can be obtained by replacing the "serving cell" or the "SCell" in Embodiment 1 with the "CC set" or the "reference BWP/CC", and details will not be described herein again.

Ci may also be replaced with CCi, and the indicated meaning is not changed.

TCi

The TCi field indicates the number of TRPs of a CC set or a reference BWP/CC configured with the multi-TRP BFD/BFR on which a beam failure is detected when the beam failure is detected on the CC set or the reference BWP/CC configured with the multi-TRP BFD/BFR.

i corresponds to the number or the index of a CC set or a reference BWP/CC. For example, $TC_1$ corresponds to beam failure detection for the CC set or the reference BWP/CC numbered 1.

For a CC set or a reference BWP/CC configured with the cell-level BFD/BFR, the TCi field is not present, and is replaced with the reserved bit of the R field.

For a CC set or a reference BWP/CC configured with the multi-TRP BFD/BFR, when the corresponding Ci field is set to 0, the TCi field is not present, and is replaced with the reserved bit of the R field.

For a serving cell configured with the multi-TRP BFD/BFR, when the corresponding Ci field is set to 1, the TCi field is present. The meaning specifically indicated by the TCi being set to 0 or 1 for the "CC set" or the "reference BWP/CC" can be obtained by replacing the "serving cell" or the "SCell" in Embodiment 1 with the "CC set" or the "reference BWP/CC", and details will not be described herein again.

The meanings of the TRP, AC, Candidate RS ID, and R fields are all the same as those in Embodiment 1.

The table below shows possible distributions of these fields. Eight CC sets are configured as an example:

| $C_7$ | $C_6$ | $C_5$ | $C_4$ | $C_3$ | $C_2$ | $C_1$ | $C_0$ |
|---|---|---|---|---|---|---|---|
| $TC_7$/R | $TC_6$/R | $TC_5$/R | $TC_4$/R | $TC_3$/R | $TC_2$/R | $TC_1$/R | $TC_0$/R |
| AC | TRP/R | | | Candidate RS ID or R bits | | | |
| | | | | . . . | | | |
| AC | TRP/R | | | Candidate RS ID or R bits | | | |

Figure 2:
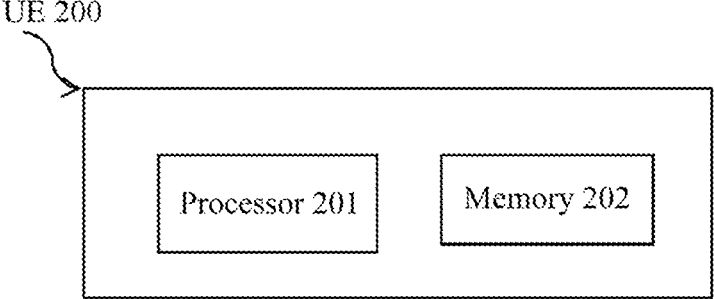
FIG. 2 is a simplified structural block diagram of user equipment (UE) according to the present invention.

FIG. 2 is a simplified structural block diagram of user equipment (UE) according to the present invention. As shown in FIG. 2, user equipment (UE) 200 includes a processor 201 and a memory 202. The processor 201 may include, for example, a microprocessor, a microcontroller, an embedded processor, and the like. The memory 202 may include, for example, a volatile memory (such as a random access memory (RAM)), a hard disk drive (HDD), a non-volatile memory (such as a flash memory), or other memories. etc. The memory 202 has program instructions stored thereon. The instructions, when run by the processor 201, can implement the above method performed by user equipment as described in detail in the present invention.

The program running on the device according to the present invention may be a program that enables a computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing the programs by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application-specific integrated circuits (ASICs), field-programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment (UE), comprising:

a processor configured to:

generate a Medium Access Control (MAC) control element (CE) comprising a first field indicating a beam failure detection (BFD) for a special cell (SpCell) in response to a beam failure recovery (BFR) being triggered, wherein in a case that the SpCell is configured with two first beam failure detection reference signal (BFD-RS) sets, the first field being set to 1 indicates that a beam failure for the SpCell is detected for at least one of the two first BFD-RS sets and that a candidate beam evaluation has been completed, and the first field is set to 0 in a case that the beam failure for the SpCell is detected for the at least one of the two first BFD-RS sets but the candidate beam evaluation has not been completed.

2. The UE according to claim 1, wherein the MAC CE further comprises a second field, the second field indicates a BFD for a secondary cell (SCell), the second field being set to 0 indicates that a beam failure for the SCell is not detected for any second BFD-RS set of the SCell or the beam failure is detected for at least one second BFD-RS set of the SCell but a candidate beam evaluation has not been completed, and the second field being set to 1 indicates that the beam failure for the SCell is detected for the at least one second BFD-RS set of the SCell and the candidate beam evaluation has been completed.

3. The UE according to claim 2, wherein the MAC CE further comprises a third field, the third field in the MAC CE corresponds to a serving cell, in a case that the serving cell is configured with two third BFD-RS sets and the second field for the serving cell is set to 1:

the third field being set to 0 indicates that a beam failure for the serving cell is detected for one of the two third BFD-RS sets of the serving cell, a candidate beam evaluation for the one has been completed, and an octet containing a field indicating presence of a candidate beam is present for the serving cell in the MAC CE, and the third field being set to 1 indicates that the beam failure for the serving cell is detected for the two third BFD-RS sets, a candidate beam evaluation for both of the two third BFD-RS sets has been completed, and two octets, each containing a field indicating presence of a candidate beam, are present for the serving cell in the MAC CE.

4. The UE according to claim 3, wherein the MAC CE further comprises a fourth field, the fourth field indicates an identity of a BFD-RS set, the fourth field being set to 0 indicates a BFD-RS set 1, the fourth field being set to 1 indicates a BFD-RS set 2, and the fourth field is set to 0 in a case that the serving cell is not configured with two BFD-RS sets.

5. A base station apparatus that communicates with a user equipment (UE), comprising:

a processor configured to:

receive a Medium Access Control (MAC) control element (CE) comprising a first field indicating a beam failure detection (BFD) for a special cell (SpCell) in response to a beam failure recovery (BFR) being triggered, wherein in a case that the SpCell is configured with two first beam failure detection reference signal (BFD-RS) sets, the first field being set to 1 indicates that a beam failure for the SpCell is detected for at least one of the two first BFD-RS sets and that a candidate beam evaluation has been completed, and the first field is set to 0 in a case that the beam failure for the SpCell is detected for the at least one of the two first BFD-RS sets but the candidate beam evaluation has not been completed.

6. The base station apparatus according to claim 5, wherein the MAC CE further comprises a second field, the second field indicates a BFD for a secondary cell (SCell), the second field being set to 0 indicates that a beam failure for the SCell is not detected for any second BFD-RS set of the SCell or the beam failure is detected for at least one second BFD-RS set of the SCell but a candidate beam evaluation has not been completed, and the second field being set to 1 indicates that the beam failure for the SCell is detected for the at least one second BFD-RS set of the SCell and the candidate beam evaluation has been completed.

7. The base station apparatus according to claim 6, wherein the MAC CE comprises a third field, the third field corresponds to a serving cell, in a case that the serving cell is configured with two third BFD-RS sets and the second field for the serving cell is set to 1:

the third field being set to 0 indicates that a beam failure for the serving cell is detected for one of the two third BFD-RS sets of the serving cell, a candidate beam evaluation for the at least one has been completed, and an octet containing a field indicating presence of a candidate beam is present for the serving cell in the MAC CE, and the third field being set to 1 indicates that the beam failure for the serving cell is detected for the two third BFD-RS sets, a candidate beam evaluation for both of the two third BFD-RS sets has been completed, and two octets, each containing a field indicating presence of a candidate beam, are present for the serving cell in the MAC CE.

8. The base station apparatus according to claim 7, wherein the MAC CE further comprises a fourth field, the fourth field indicates an identity of a BFD-RS set, the fourth field being set to 0 indicates a BFD-RS set 1, the fourth field being set to 1 indicates a BFD-RS set 2, and the fourth field is set to 0 in a case that the serving cell is not configured with two BFD-RS sets.

9. A method performed by a user equipment (UE), the method comprising:

generating a Medium Access Control (MAC) control element (CE) comprising a first field indicating a beam failure detection (BFD) for a special cell (SpCell) in response to a beam failure recovery (BFR) being triggered, wherein in a case that the SpCell is configured with two first beam failure detection reference signal (BFD-RS) sets, the first field being set to 1 indicates that a beam failure for the SpCell is detected for at least one of the two first BFD-RS sets and that a candidate beam evaluation has been completed, and the first field is set to 0 in a case that the beam failure for the SpCell is detected for the at least one of the two first BFD-RS sets but the candidate beam evaluation has not been completed.

\* \* \* \* \*